Nov. 19, 1935.  G. STINSON ET AL  2,021,814

BABY CARRIAGE

Filed June 14, 1933   2 Sheets-Sheet 1

Inventors:
George Stinson
Joseph F. Magee
By Geo. H. Kennedy Jr.
Attorney

Nov. 19, 1935.     G. STINSON ET AL     2,021,814
BABY CARRIAGE
Filed June 14, 1933     2 Sheets-Sheet 2
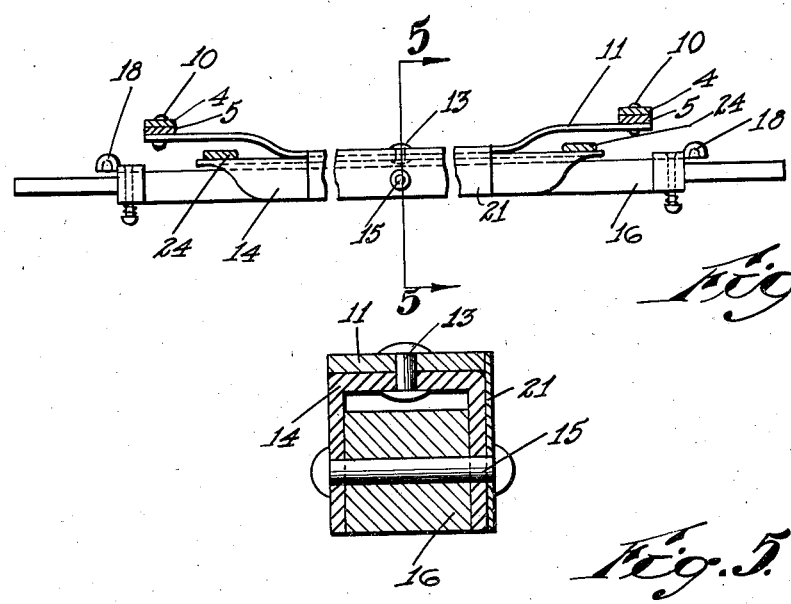
Fig. 3.
Fig. 5.
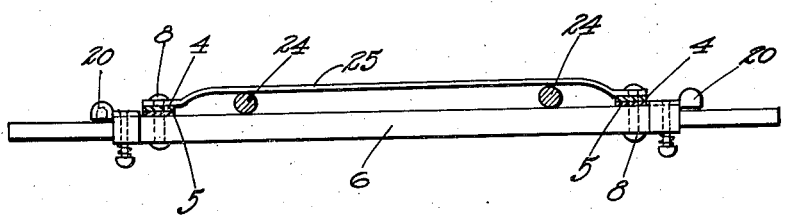
Fig. 4.
Inventors.
George Stinson
Joseph F. Magee
By Geo. H. Kennedy Jr.
Attorney Patented Nov. 19, 1935

2,021,814

UNITED STATES PATENT OFFICE 2,021,814

BABY CARRIAGE

George Stinson, Gardner, Mass., and Joseph F. Magee, Philadelphia, Pa., assignors to Heywood-Wakefield Company, Boston, Mass., a corporation of Massachusetts Application June 14, 1933, Serial No. 675,786

6 Claims. (Cl. 280—48)

The present invention relates to baby carriages and particularly to a novel structure by which the baby carriage is steered.

In prior devices of this character, the supporting wheels have been mounted on axles which are positioned in fixed relation to each other, being connected to a rigid frame. Turning of the carriage has necessitated raising either the forward or rear wheels of the carriage from the ground by lifting or pushing downwardly on the handle of the vehicle, and subsequent turning of the carriage while the wheels are so elevated. It is the principal object of the present invention to provide for turning or steering of the carriage without the necessity for raising any of the wheels from the supporting surface, and to this end certain of the wheels are arranged to turn about vertical axes.

Other and further objects and advantages of the invention will more fully appear from the following detailed description taken in connection with the accompanying drawings in which:—

Fig. 3 is a sectional view substantially along the line 3—3 of Fig. 2.

Fig. 4 is a sectional view substantially along the line 4—4 of Fig. 2.

Fig. 5 is a sectional view substantially along the line 5—5 of Fig. 3.

Like reference characters refer to like parts in the different figures.

Figure 1:
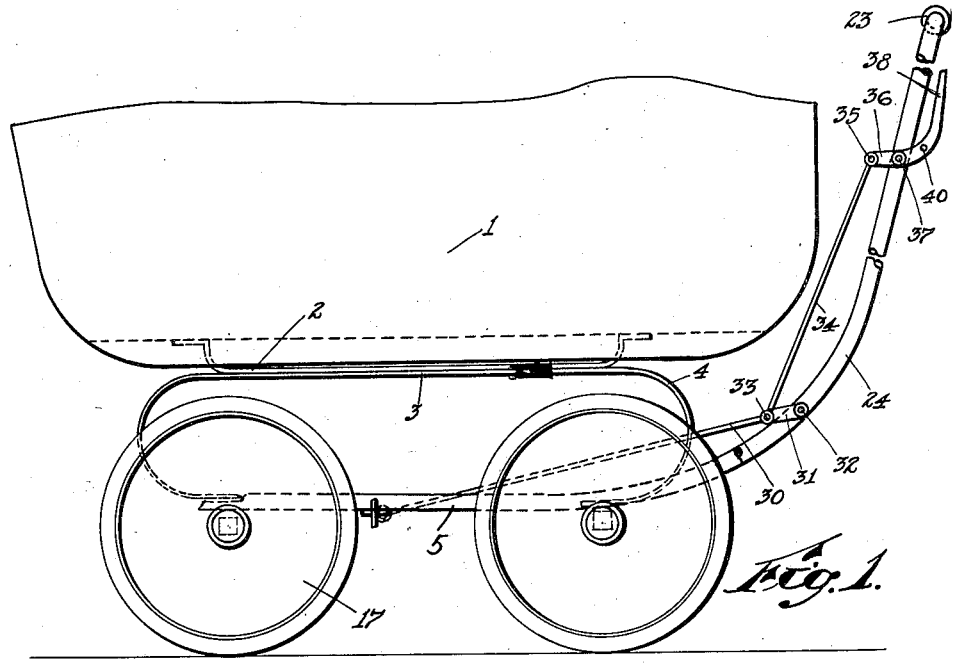
Fig. 1 is a fragmentary side elevation of a baby carriage embodying the invention.

Referring to the drawings, the carriage comprises a body 1 having a pair of spaced downwardly extending brackets 2 secured thereto adjacent opposite sides of the body, said brackets being riveted or otherwise connected to the horizontal portions 3 of springs 4 by which the body is connected to the running gear. The ends of each of the springs 4 are bent downwardly and inwardly and are secured to parallel longitudinal members 5 which form a part of the running gear. A rear axle 6, on the opposite ends of which the rear wheels 7 are rotatably mounted, is secured directly to the rearward ends of the springs 4 and to the rearward ends of the members 5 as by rivets 8 extending, as shown in Fig. 4, through the members 5, the ends of the springs 4 and the axle.

Referring to Fig. 3, the forward ends of the longitudinal members 5 are connected to the forward ends of the springs 4 by rivets 10 which extend through said members and springs and which also extend through a transverse member 11 parallel to the rear axle 6. The rear axle 6, the longitudinal members 5, and the transverse member 11 form a substantially rigid supporting frame for the body of the carriage. The central portion of the member 11 is lower than the ends thereof and supports a centrally positioned vertical rivet or pin 13, the latter providing a pivotal support for a transverse member 14 extending beneath and substantially parallel to the member 11.

The member 14 is U-shaped in cross-section having downwardly extending flanges as indicated in Fig. 5 and has a rivet or pin 15 extending horizontally therethrough in vertical alinement with the pin 13. A front axle 16 is positioned between the downwardly extending flanges of the member 14 and is pivotally mounted on the rivet 15, having a limited turning movement thereon as will be apparent. By pivotally mounting one of the axles for movement in a vertical plane it will be apparent that all four wheels of the vehicle will remain in contact with the surface on which the vehicle rests independently of irregularities in said surface. The front wheels 17, Fig. 1, are journaled on the opposite ends of the axle 16 and are held against removal from said axle by suitable clips 18 corresponding to the clips 20 by which the rear wheels are held in position, all of said clips being of well-known construction. The transverse member 14 is turnable in a horizontal plane, as above stated, about the pin 13 as an axis and said member is normally retained in parallel relation to the member 11 by a leaf spring 21 which is held in position by the rivet 15, said spring engaging the rearward sides of said transverse members 11 and 14, as best shown in Fig. 5.

Figure 2:
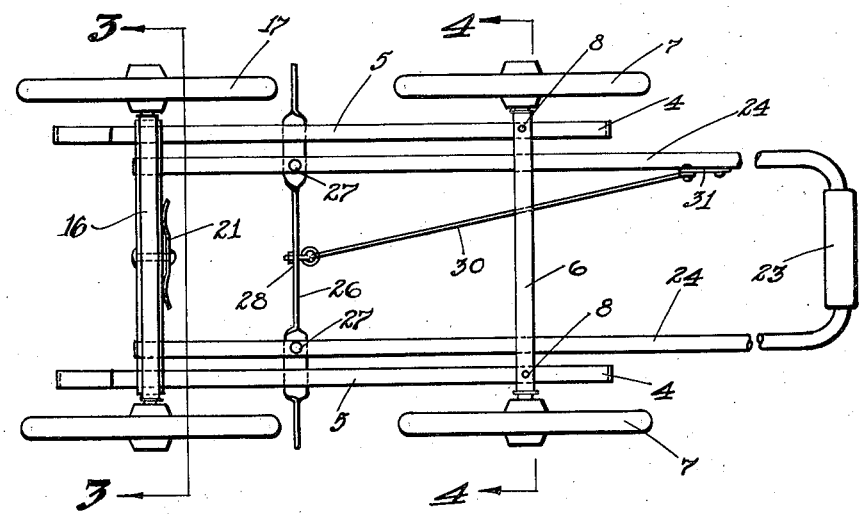
Fig. 2 is an inverted plan view of the carriage showing the running gear.

The carriage has a handle projecting upwardly from the running gear or frame at the rear of the carriage, said handle, as shown in Fig. 2, comprising a crossbar 23 at the upper end thereof and substantially parallel downwardly extending members 24 by which the crossbar is connected to the running gear. The forward ends of the members 24 extend horizontally beneath the carriage and are secured, as shown in Fig. 3, to the opposite ends of the member 14. The members 24 overlie the rear axle 6 directly thereabove and are held against vertical movement, although permitted to move laterally, by a transverse bar 25 which extends in parallel relation to the rear axle 6 and overlies the members 24, said bar 25 having its opposite ends connected to the axle 6 by the rivets 8 above referred to.

The running gear is provided with a brake which is arranged to engage the front wheels 17 regardless of their position. As shown in Fig. 2, a transverse strip 26 of resilient material is secured as by rivets 27 to the members 24 between the front and rear axles. The outer ends of the strip 26 are in a vertical plane for engagement with the periphery of the wheels 17. The strip 26 is provided centrally with an eye bolt 28 which is connected by a link 30 to a short link 31 pivotally mounted on a pin 32 on one of the members 24 rearwardly of the rear axle 6. The pin 33, which provides the pivotal connection between the links 30 and 31, also supports an upwardly extending link 34 which is connected by a pin 35 to a lever 36. The lever 36 is pivoted on a pin 37 on the same member 24 that supports the pin 32 and has an upwardly extending end 38 by which said lever is manually rocked, downward movement of said lever procuring upward movement of the pin 33 and a corresponding rearward movement of the central portion of the strip 26. The latter pivots about the rivets 27 and the outer ends of said strip moved forwardly and engage the wheels 17 to prevent their rotation. A stud 40 on the lever 36 engages the link 34 when said lever is in its downward position and the brake or strip 26 is accordingly locked in engagement with the front wheels.

From the foregoing, it will be apparent that the front wheels 17 of the vehicle are mounted for simultaneous turning movement about a vertical axis to permit the carriage or vehicle to be steered. The turning movement is responsive to a lateral movement of the crossbar 23 by which the vehicle is pushed, a lateral movement of the crossbar to the right procuring a turning movement of the wheels to the left and similarly lateral movement of the crossbar to the left providing for turning of the carriage to the right. In the operation of the usual type of baby carriage, the person propelling the vehicle has necessarily moved the crossbar of the handle laterally for turning the carriage. By the present invention, the vehicle has accordingly become a self-steering carriage since the front wheels thereof are automatically turned for steering by a lateral movement of the crossbar in the direction in which the crossbar would normally be shifted for turning of the usual carriage. The necessary raising or lowering of the handle for raising either the forward or rear wheels of the carriage from the supporting surface for turning of the vehicle has, however, been eliminated by the structure above disclosed.

We claim,

1. In a baby carriage, a body, a supporting frame including front and rear axles for the body, wheels on said axles, one of said axles being turnable about a substantially vertical axis, a handle connected to said turnable axle and extending upwardly therefrom at one end of the vehicle for turning movement of the axle in response to a lateral movement of the handle, and a brake mounted on said handle and engageable with the wheels on said turnable axle independently of their position.

2. In a baby carriage, a body, a supporting frame including front and rear axles for the body, wheels on said axle, a transverse member connected to and forming a part of the supporting frame, and on which one of the axles is mounted for turning movement about a substantially vertical axis, a handle extending rearwardly from said turnable axle and upwardly at the end of the carriage, and a brake mounted on said handle and movable therewith for engagement with the periphery of the turnable wheels.

3. In a baby carriage, a body, a supporting frame including front and rear axles for the body, wheels on said axles, one of said axles being turnable about a substantially vertical axis, a handle secured to said turnable axis and extending upwardly beyond one end of the body of the carriage for turning movement of the axle in response to a lateral movement of the upper end of said handle, spring means normally retaining said axles in parallel relation, and a brake mounted on said handle and movable therewith whereby said brake is engageable with the wheels on the turnable axis independently of their position.

4. In a baby carriage, a body, a supporting frame including front and rear axles for the body, wheels on said axles, one of said axles being turnable relative to the frame about a substantially vertical axis, a handle by which the carriage is propelled, said handle being directly secured to the latter axle for turning movement thereof in response to movement of the handle, and a brake mounted on said handle and movable therewith for engagement with the wheels on the turnable axle independently of their position.

5. In a baby carriage, a body, a supporting frame for the body, front and rear axles secured to said frame, wheels on the opposite ends of each of said axles, one of said axles being mounted for turning movement relative to said frame about a vertical axis to provide for steering of the carriage, and a brake mounted for turning movement as a unit with said turnable axle and engageable with the periphery of the wheels on said axle, whereby said brake is engageable with said wheels independently of their position.

6. In a baby carriage, a body, a supporting frame, front and rear axles mounted on said frame, wheels on the opposite ends of each of said axles, one of said axles being mounted for turning movement relative to said frame about a substantially horizontal axis, whereby all of said wheels remain in contact with the surface on which the carriage is positioned independently of irregularities in said surface, one of said axles being mounted for a turning movement about a substantially vertical axis, a handle secured directly to said latter axle and extending upwardly therefrom for propulsion of the carriage, lateral movement of said handle procuring a turning movement of said axle on its vertical axis for steering of the carriage.

GEORGE STINSON.
JOSEPH F. MAGEE.